(12) United States Patent
Knorr

(10) Patent No.: US 7,876,001 B2
(45) Date of Patent: Jan. 25, 2011

(54) DIRECT-DRIVE BUILT-IN MOTOR WITH SPECIAL SENSOR ATTACHMENT

(75) Inventor: Markus Knorr, Augsburg (DE)

(73) Assignee: Siemens Aktiengesellschaft, München (DE)

( * ) Notice: Subject to any disclaimer, the term of this patent is extended or adjusted under 35 U.S.C. 154(b) by 161 days.

(21) Appl. No.: 12/281,827

(22) PCT Filed: Feb. 1, 2007

(86) PCT No.: PCT/EP2007/050975

§ 371 (c)(1),
(2), (4) Date: Sep. 5, 2008

(87) PCT Pub. No.: WO2007/101759

PCT Pub. Date: Sep. 13, 2007

(65) Prior Publication Data

US 2009/0091217 A1    Apr. 9, 2009

(30) Foreign Application Priority Data

Mar. 6, 2006    (DE) .................. 10 2006 010 198

(51) Int. Cl.
*H02K 41/02* (2006.01)
*H02K 41/00* (2006.01)
*H02K 11/00* (2006.01)

(52) U.S. Cl. ............... 310/12.19; 310/12.01; 310/12.24; 310/13; 310/14; 310/68 B

(58) Field of Classification Search ............. 310/12.01, 310/12.08, 12.19, 12.24, 68 B, 13, 14
See application file for complete search history.

(56) References Cited

U.S. PATENT DOCUMENTS 5,530,303 A    6/1996    Takei (Continued)

FOREIGN PATENT DOCUMENTS

EP    1 168 585 A2    1/2002

(Continued)

OTHER PUBLICATIONS

Derwent English-language Abstract KR2001047040 (2001).*

*Primary Examiner*—Quyen Leung
*Assistant Examiner*—Jose A Gonzalez Quinones
(74) *Attorney, Agent, or Firm*—Henry M. Feiereisen; Ursula B. Day

(57) ABSTRACT

The aim of the invention is to simplify and to secure the mounting and adjusting of sensors on built-in motors. As a result, a direct drive built-in motor is equipped with a first motor component (2) which comprises at least one motor mounting element (21) for securing the first motor component (2) to a first machine part (4), and a second motor component which cooperates with the first motor component (2) for carrying out an opposite-sided movement. Also, a sensor device (5, 6) can be secured to the first motor component (2). Said sensor device comprises at least one sensor mounting bore (61) which is arranged in a predetermined manner through the motor mounting part and can be connected to the first machine part Also, the position and/or orientation of the sensor device (5, 6) are predetermined in a mounted state on the first machine part (2).

12 Claims, 2 Drawing Sheets

U.S. PATENT DOCUMENTS

| | | | |
|---|---|---|---|
| 6,777,832 B2 * | 8/2004 | Watanabe | 310/12.24 |
| 6,963,148 B1 | 11/2005 | Chitayat | |
| 7,044,728 B2 * | 5/2006 | Schunck et al. | 425/562 |
| 2002/0089238 A1 * | 7/2002 | Rudy | 310/12 |
| 2005/0140214 A1 * | 6/2005 | Arai | 310/12 |

FOREIGN PATENT DOCUMENTS

| | | | |
|---|---|---|---|
| JP | 60 134915 A | | 7/1985 |
| JP | 7 284251 A | | 10/1995 |
| KR | 2001047040 A | * | 6/2001 |
| WO | WO 2005/122368 A1 | | 12/2005 |

* cited by examiner

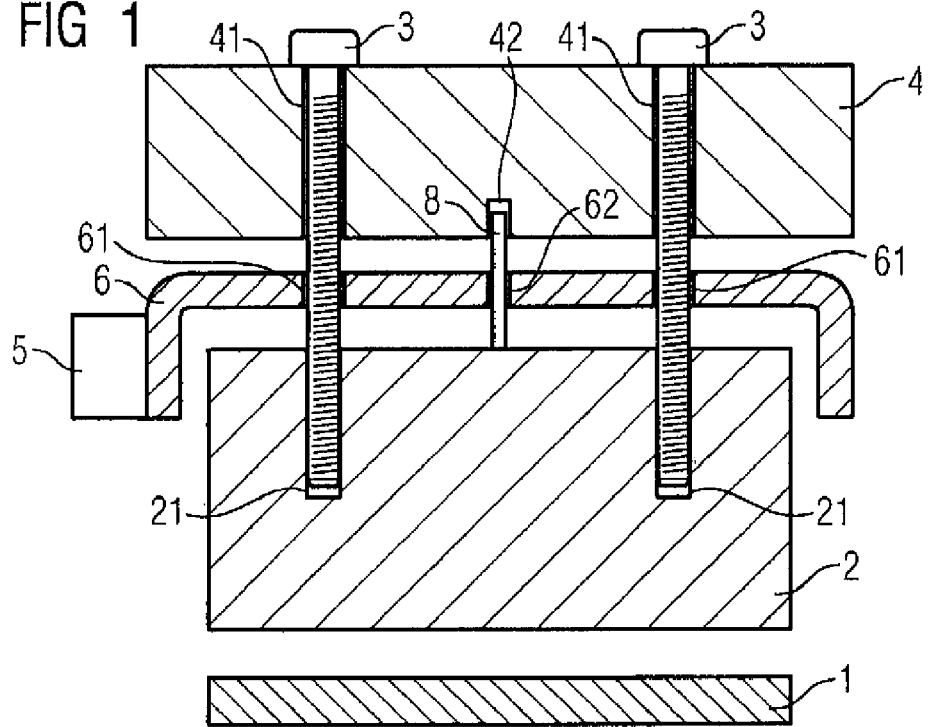
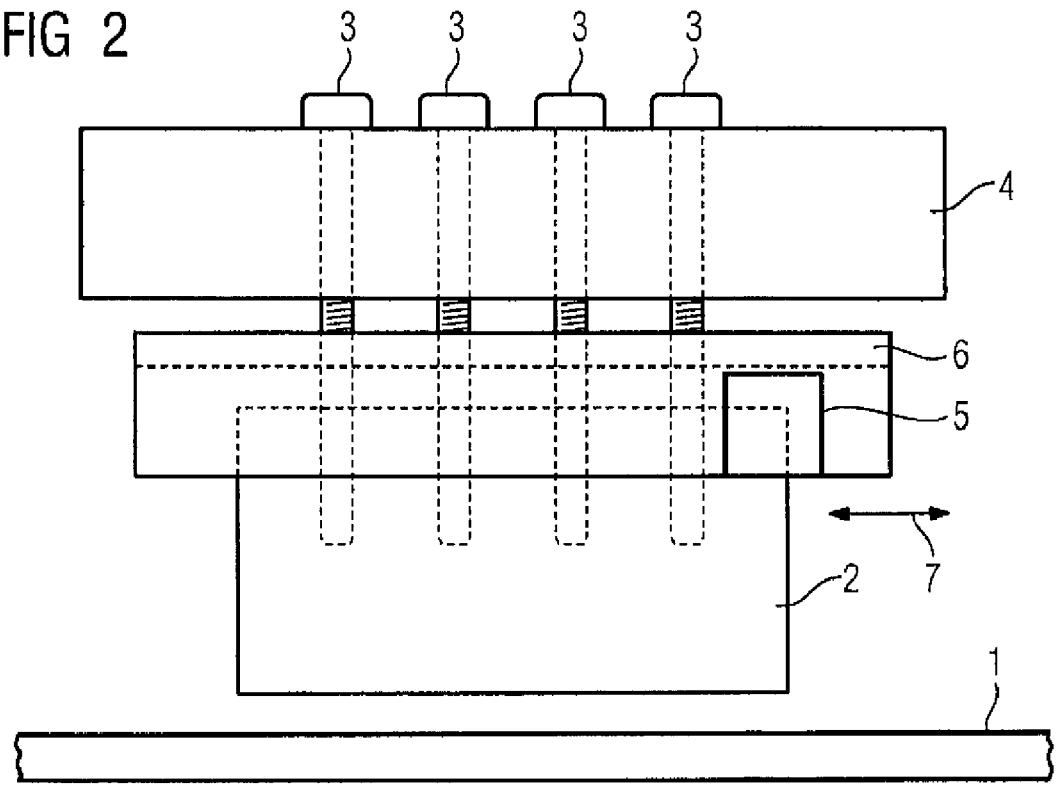

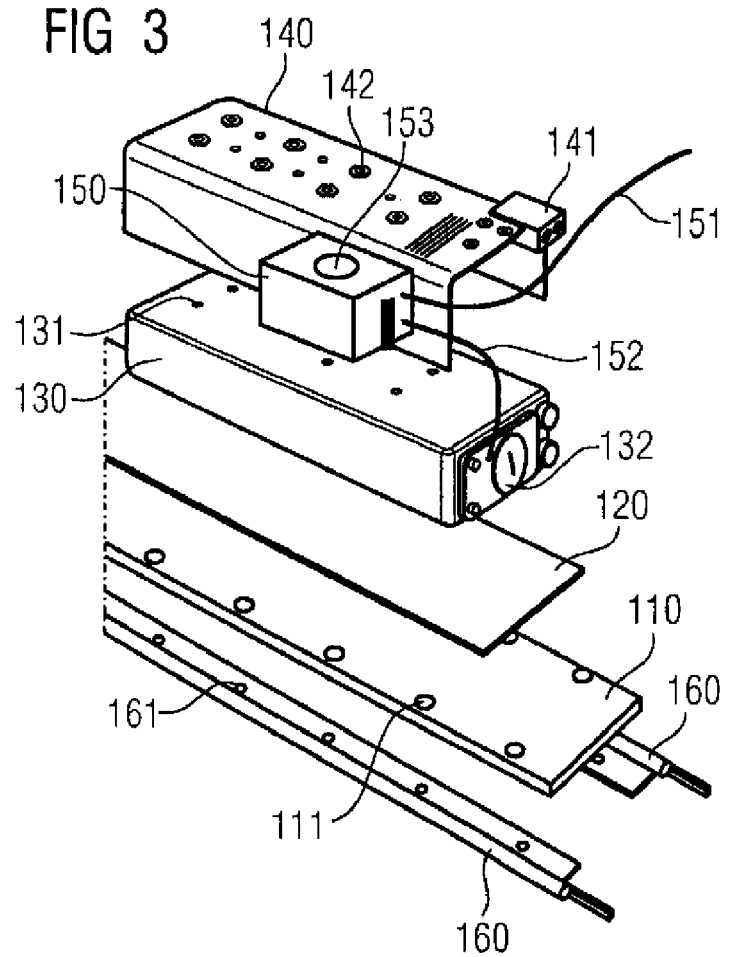
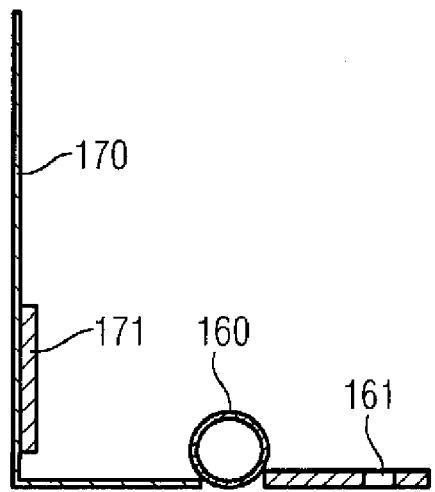

DIRECT-DRIVE BUILT-IN MOTOR WITH SPECIAL SENSOR ATTACHMENT

BACKGROUND OF THE INVENTION

The present invention relates to a direct-drive built-in motor having a first motor component which has at least one motor mounting element for attachment of the first motor component to a first machine part, a second motor component which interacts with the first motor component for movement with respect to one another, and a sensor device which can be attached to the first motor component.

In the case of motors, it is frequently necessary to record kinematic variables of their movement, for example position, speed or acceleration. This recording is usually used to control the stated variables and/or to determine the pole position and/or the commutation angle when a synchronous motor with permanent-magnet excitation is being operated using a converter. Sensors are generally integrated in the motor in order to record the kinematic variables.

In the case of direct-drive built-in motors, it is necessary for the user himself to mount the individual motor components on the corresponding machine parts. If a kinematic sensor also needs to be integrated for control purposes, this can therefore lead to association problems in design and assembly. For example, a position measurement system which produces absolute position information for commutation may be equipped with an incorrect position sensor or may be positioned incorrectly while being fitted. This leads to delays in commissioning, to faults during operation resulting in inadequate motor performance, or even damage. A further problem can occur as a result of the lack of an adjustment capability, or maladjustment of the sensors.

Until now, in the case of built-in motors in which the bearings and guides are not predetermined, the only way to avoid these problems has been by complex commissioning procedures. Specialist personnel are required for these procedures, and must also be provided for servicing. This impedes the use of built-in direct drives in particular in the low-cost range.

SUMMARY OF THE INVENTION

The object of the present invention is therefore to simplify the fitting of built-in direct drives to corresponding machine parts.

According to the invention, this object is achieved by a direct-drive built-in motor having a first motor component which has at least one motor mounting element for attachment of the first motor component to a first machine part, a second motor component which interacts with the first motor component for movement with respect to one another, and a sensor device which can be attached to the first motor component, wherein the sensor device has at least one sensor mounting hole, which is arranged in a predetermined manner and through which the motor mounting element can be connected to the first machine part, such that the sensor device is in a predetermined position and/or orientation when it is mounted on the first machine part.

The user can therefore advantageously attach the motor and sensor components to the respective machine parts, such that they are precisely adjusted, without a large amount of effort. In consequence, the user can himself look for the individually desired sensor device, freeing the machine manufacturer of the need to provide a plurality of fixed motor sensor systems, or motor sensor systems which can only be used generally. The user can himself assemble the desired system in a modular form, without having to accept loss of adjustment precision.

The first motor component is preferably the primary part of a linear motor. This means that the advantages according to the invention can also be exploited for linear built-in synchronous motors.

For attachment purposes, the sensor device may have a mounting plate in which the sensor mounting hole is located. A metal plate such as this can generally be inserted between the motor component and the corresponding machine part, without loss of robustness. The position and orientation of the sensor head are then also predetermined automatically with the fixing of this metal plate, to which the sensor head is attached.

Furthermore, at least one additional adjustment element can be fitted to the sensor device, for relatively accurate adjustment of the sensor device on the first machine part. This makes it possible to make the adjustment tolerances finer.

In one advantageous embodiment of the present invention a cooling unit is integrated in the sensor device. Specifically, the cooling unit may have a cooling cap in which the sensor mounting hole is arranged. This results in the sensor device and the cooling unit having a dual functionality.

According to a further embodiment, the direct-drive built-in motor may have a reference measure device with at least one dimension mounting hole arranged in a predetermined manner, through which the second motor component can be attached to a second machine part, such that the reference measure device is in a predetermined position and/or orientation, with respect to the second machine part, when the second motor component is mounted on the second machine part. This means that a plurality of sensor components can be aligned and mounted on different machine parts, in each case using the same advantageous adjustment technique.

The reference measure device may also have a cooling unit, and may likewise have an electrically conductive metal plate for a Ferraris sensor, which is contained in the sensor device. This in turn ensures the multifunctionality of the reference measure.

It is also advantageous for the sensor device to have a threaded hole for direct fixing to the first machine part. This makes it possible to avoid disturbing oscillations of the sensor head.

BRIEF DESCRIPTION OF THE DRAWING

The present invention will now be explained in more detail with reference to the attached drawings, in which:

FIG. 1 shows a cross section through a linear motor according to the invention;

FIG. 2 shows a side view of the linear motor shown in FIG. 1;

FIG. 3 shows an exploded view of a linear built-in motor according to the invention; and FIG. 4 shows a cross section through a cooling profile with a reference measure.

DETAILED DESCRIPTION OF PREFERRED EMBODIMENTS

The exemplary embodiments described in more detail in the following text represent preferred embodiments of the present invention.

A first embodiment of the present invention is illustrated in the form of a cross section in FIG. 1. This is a built-in linear motor for the direct drive. The individual components are illustrated only in the form of sketches. A primary part 2 is arranged above a secondary part 1. This primary part 2 is attached to a machine carriage 4 with the aid of screws 3. A sensor 5, for example a Ferraris sensor for acceleration measurement, is attached to the primary part 2 or to the machine carriage 4 with the aid of a metal plate 6. For attachment, the metal plate 6 has holes 61 which are aligned with holes 21 (motor mounting elements) in the primary part and with holes 41 in the machine carriage. When the primary part 2 is being attached to the machine carriage 4, the metal plate 6 is placed between these two components such that the respective holes are located coaxially one above the other. The individual parts are a screwed to one another by means of the screws 3. The individual parts 2, 4, 6 in this case touch or are separated from one another by means of a spacer or spacers. For the sake of clarity, the individual parts are separated from one another without any spacers in FIG. 1.

The attachment of the primary part 2 to the machine carriage 4 with the interposition of the metal plate 6 can also be carried out by means of other pins or bolts instead of the screws 3. Pins or bolts such as these may be firmly connected to the primary part, as motor mounting elements.

FIG. 2 shows a side view of the linear motor from FIG. 1. In this case, an arrow 7 indicates that the primary part 2, including the machine carriage 4 and the sensor 5, can be moved linearly with respect to the secondary part.

Since the linear motors illustrated in FIGS. 1 and 2 are built-in drives, the sensor 5 must be adjusted precisely on the primary part 2 and the machine carriage 4 if, for example, it is intended to be used for an absolute position measurement. This problem can be solved by use of the same screw holes 21, 41, 61 in the machine carriage and in the sensor and motor components. Instead of fixing the sensor 5 to the primary part 2, this can also be attached to the secondary part 1 by using the screw holes in the secondary part 1 with coaxial holes in the metal plate 6 of the sensor device for fixing and adjustment.

Not only built-in linear motors but also built-in torque motors can profit from this adjustment technique. In this case, the screw holes in the rotor or stator can be used for fixing the sensor.

The technique according to the invention allows sufficiently accurate adjustment for absolute position measurement to be achieved for commutation purposes, since the motor components are also mounted only within the tolerances of their mounting holes. In particular, this also allows sensor components to be fitted without any additional screw holes in the motor or in the machine, for the same or greater adjustment tolerances, as are required for motor components.

In situations which demand finer adjustment tolerances for the sensor components, in comparison to the motor components for sensor operation reasons, a finer fitting tolerance for the measurement system components can be achieved by a small number of adjustments pins or stop switches, and/or centring shoulders, between the machine frame and the sensor components. In situations such as these, the mounting holes 61 in the sensor components should be subject to tolerances with adequate play with respect to the mounting screw diameter. FIG. 1 shows a sketch of an adjustment pin 8 such as this. In this case, it is attached to the primary part 2 and extends through a hole 62 in the metal plate 6 into a hole 42 in the machine carriage 4. The adjustment pin 8 may, of course, also be attached to the machine carriage 4, and project into a corresponding hole in the primary part 2. The tolerance of the hole 62 with respect to the adjustment pin 8 then governs the play of the sensor 5, in terms of position and orientation. The play can be restricted by further adjustment pins.

In principle, this allows any desired number of sensors to be fitted to the motor. This includes not only kinematic sensors for recording position, speed and acceleration, but also, for example, temperature sensors. Position systems which measure inductively and/or magnetically should also be stressed in particular in addition to Ferraris acceleration sensors.

As a result of a connecting element which projects well out between the sensor element 5 and the mounting hole 61, that is to say by a long section of the metal plate 6, this type of fitting of the sensor element 5 can lead to undesirable natural oscillations at low resonant frequencies of the sensor element, which, for example for control purposes, may have a disadvantageous effect. In this case, the sensor element 5, which in general has a very low mass, can be fixed to the machine carriage (cf. FIG. 3), for example, by one or more small screws. Play can be provided in a suitable manner between the fixing screw diameter and a fixing hole in the sensor element.

FIG. 3 shows one specific exemplary embodiment of a direct-drive built-in motor according to the invention. The individual components are shown in an exploded illustration. A covering film 120 is located on a secondary part 110, and the primary part 130 of a built-in linear motor runs above this. This primary part is cooled with the aid of a cooling shroud 140. Appropriate cooling connections 141 are provided for this purpose. The cooling shroud 140 can be attached to the primary part 130 by means of holes 142. The primary part 130 therefore also has corresponding holes 131.

A sensor unit or a sensor 150 is fixed to the cooling shroud 140. The cooling shroud 140 is therefore used not only for cooling the primary part 130 but also for fixing the sensor 150. In addition, a threaded hole 153 is indicated in the housing of the sensor 150, and allows fixing to a machine frame in a manner which is stable with respect to oscillations.

In this case, the sensor 150 is in the form of a combined Ferraris sensor and position sensor. It also has interface electronics, which can be connected via a connecting line 151 to a converter or a control unit. A temperature sensor 132 which is built into the primary part 130 is connected to the interface electronics via a further line 152, so that communication takes place between the temperature sensor and a control unit via the sensor unit 150.

The power can also be supplied to the primary part 130 via the interface electronics of the sensor unit 150. The power can accordingly be transmitted via the cable 151 or an additional cable to the sensor element 150, and from there via the cable 152 to the primary part 130. The cables 151 and 152 can therefore be used both for data and for supplying power.

The fitting of the sensor unit 150 to the cooling shroud 140 has the further advantage that the electronics and/or sensor system contained therein can have their temperatures controlled, and in particular may be cooled. This makes it possible, for example, to suitably cool measurement elements, such as the Ferraris sensors, which cause a power loss.

A cooling device can also be provided on the secondary part 110 of the linear motor. In the example shown in FIG. 3, this is provided by means of cooling tubes 160, which can be fixed to holes 111 in the secondary part with the aid of holes 161. If sensor components are attached to the cooling tubes 160 at the same time, then the inventive idea of adjusting the sensor components via the screw holes 161 on the secondary part 110 can likewise be implemented.

FIG. 4 shows a cross section through the cooling tube 160. A hole 161 can be seen in the cooling profile. An aluminum plate 170 with an L-shaped cross section is now additionally attached to this cooling profile. The aluminum plate is used as an eddy current strip for the Ferraris sensor in the sensor unit 150. Furthermore, a reference measure 171 is fitted to the aluminum plate 170 and is used for position measurement, with the aid of the position sensor in the sensor unit 150.

Further sensor components, in the present case the eddy current strip and the reference measure 171, are thus accurately adjusted via the metal plate of the cooling profile, and via its holes 161. Even passive sensor components on the built-in motor can therefore be adjusted, by using its mounting holes.

For the machine manufacturer, this therefore results in the advantage that there is no need to fit sensors or measurement systems permanently to the motor, in order to avoid maladjustments. In fact, the user can carry out the adjustment himself and, in consequence, can himself look for sensors and measurement systems which are suitable for him. Further advantages result from the fact that built-in motors can be tested completely in control link before delivery, allowing simplified fitting while reducing installation errors in the motor sensor system for the machine manufacturer, and that the sensors can be cooled and that this allows simplified and safe commissioning by means of a PLUG and PLAY technique, at the machine manufacturer's.

What is claimed is:

1. A direct-drive built-in motor, comprising:
    a first motor component having at least one motor mounting element for attachment of the first motor component to a first machine part;
    a second motor component interacting with the first motor component for movement with respect to one another; and
    a sensor device having a mounting plate provided with at least one sensor mounting hole which receives the motor mounting element of the first motor component to connect the sensor device to the first machine part and the first motor component so that the sensor device is in a predetermined position and/or orientation when mounted on the first machine part.

2. The direct-drive built-in motor of claim 1, wherein the first motor component represents a primary part of a linear motor and the second motor component represents a secondary part of the linear motor, with the primary part being linearly movable in relation to the secondary.

3. The direct-drive built-in motor of claim 1, further comprising at least one adjustment element fitted to the sensor device for adjustment of the sensor device on the first machine part.

4. The direct-drive built-in motor of claim 1, wherein the sensor device has a cooling unit.

5. The direct-drive built-in motor of claim 4, wherein the cooling unit has a cooling cap in which the sensor mounting hole is arranged.

6. The direct-drive built-in motor of claim 1, further comprising a reference measure device with at least one dimension mounting hole which is arranged in a predetermined manner and through which the second motor component attachable to a second machine part, so that the reference measure device is in a predetermined position and/or orientation with respect to the second machine part, when the second motor component is mounted on the second machine part.

7. The direct-drive built-in motor of claim 6, further comprising an adjustment for varying the predetermined position and/or orientation with respect to the second machine part.

8. The direct-drive built-in motor of claim 6, wherein the reference measure device has a cooling unit.

9. The direct-drive built-in motor of claim 6, wherein the reference measure device has an electrically conductive metal plate for a Ferraris sensor which is contained in the sensor device.

10. The direct-drive built-in motor of claim 1, wherein at least one member selected from the group consisting of the sensor device and the reference measure device has a threaded hole for direct fixing to the first machine part.

11. The direct-drive built-in motor of claim 1, wherein the mounting plate is placed between the first machine part and the first motor component.

12. The direct-drive built-in motor of claim 1, wherein the sensor mounting hole is in alignment with a hole in the first machine part and a hole in the first motor component for jointly receiving the motor mounting element.

* * * * *